(12) United States Patent
Noguchi et al.

(10) Patent No.: US 11,817,749 B2
(45) Date of Patent: Nov. 14, 2023

(54) POWER TOOL

(71) Applicant: Koki Holdings Co., Ltd., Tokyo (JP)

(72) Inventors: Yuta Noguchi, Ibaraki (JP); Hideyuki Hashimoto, Ibaraki (JP); Yuki Takahashi, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 484 days.

(21) Appl. No.: 17/049,969

(22) PCT Filed: Mar. 29, 2019

(86) PCT No.: PCT/JP2019/014018
§ 371 (c)(1),
(2) Date: Oct. 23, 2020

(87) PCT Pub. No.: WO2019/208106
PCT Pub. Date: Oct. 31, 2019

(65) Prior Publication Data
US 2021/0234438 A1    Jul. 29, 2021

(30) Foreign Application Priority Data

Apr. 27, 2018  (JP) ................. 2018-087161

(51) Int. Cl.
*H02K 11/33* (2016.01)
*H02K 11/30* (2016.01)
(Continued)

(52) U.S. Cl.
CPC .............. *H02K 11/33* (2016.01); *B23B 45/02* (2013.01); *H02K 7/145* (2013.01); *H02K 11/30* (2016.01); *H02K 2211/03* (2013.01)

(58) Field of Classification Search
CPC .......... H02K 7/14; H02K 7/145; H02K 11/33; H02K 11/30; H02K 2211/03; B25F 5/02; B25F 5/008; B23B 45/02
(Continued)

(56) References Cited

U.S. PATENT DOCUMENTS

2012/0014065 A1*  1/2012  Haga ....................... B25F 5/006
                                                          361/717
2016/0221085 A1   8/2016  Zhong et al.
(Continued)

FOREIGN PATENT DOCUMENTS

CN          103862443       6/2014
CN          105313064       2/2016
(Continued)

OTHER PUBLICATIONS

"Search Report of Europe Counterpart Application", dated Jun. 22, 2021, pp. 1-7.
(Continued)

Primary Examiner — Alexander A Singh
(74) Attorney, Agent, or Firm — JCIPRNET

(57) ABSTRACT

The purpose of the invention is to achieve a miniaturized power tool. Provided is a hammer drill (1A) that includes: a brushless motor (10) that is a drive source for a tip tool (20); a control unit for controlling the driving of the brushless motor (10); a motor housing (33) to which the brushless motor (10) is attached; and a handle housing (34) provided with a grip (2). The control unit includes: a switching board (12) and a Hall element board (13); and a converter board (11) on which an electrolytic capacitor (11a) is installed. The brushless motor (10) is disposed to be sandwiched between the electrolytic capacitor (11a), and the switching board (12) and the Hall element board (13), along the axial direction (M) of a drive shaft (16) that drives the tip tool (20).

13 Claims, 12 Drawing Sheets

(51) Int. Cl.
  *B23B 45/02* (2006.01)
  *H02K 7/14* (2006.01)
(58) Field of Classification Search
  USPC .................................................. 310/47, 50
  See application file for complete search history.

(56) References Cited

U.S. PATENT DOCUMENTS

| | | | | |
|---|---|---|---|---|
| 2016/0229045 A1* | 8/2016 | Hashimoto | .......... | B25D 17/043 |
| 2016/0359392 A1 | 12/2016 | Mergener et al. | | |
| 2017/0312902 A1* | 11/2017 | Noguchi | ................ | B25D 17/24 |
| 2017/0341213 A1* | 11/2017 | Mashiko | ............... | B24B 23/028 |

FOREIGN PATENT DOCUMENTS

| | | |
|---|---|---|
| CN | 107148327 | 9/2017 |
| EP | 2471633 | 7/2012 |
| JP | 2015160290 | 9/2015 |
| JP | 2017213661 | 12/2017 |
| JP | 2018057178 | 4/2018 |
| WO | 2018061554 | 4/2018 |

OTHER PUBLICATIONS

"International Search Report (Form PCT/ISA/210)" of PCT/JP2019/014018, dated May 21, 2019, with English translation thereof, pp. 1-3.
"Office Action of China Counterpart Application", dated Feb. 13, 2023, with English translation thereof, pp. 1-19.

* cited by examiner

POWER TOOL

CROSS-REFERENCE TO RELATED APPLICATION

This application is a 371 application of the International PCT application serial no. PCT/JP2019/014018, filed on Mar. 29, 2019, which claims the priority benefits of Japan Patent Application No. 2018-087161, filed on Apr. 27, 2018. The entirety of each of the above-mentioned patent applications is hereby incorporated by reference herein and made a part of this specification.

BACKGROUND

Technical Field

The invention relates to a power tool such as a drilling tool.

Description of Related Art

A power tool such as a drilling tool includes an electric motor (hereinafter simply referred to as a motor) as a power source, and a tool (tip tool) to be driven by the motor. A gun type power tool, in which the axial direction of a rotational shaft of the motor and the extending direction of a handle gripped by an operator intersect each other, is known as an example of the power tool.

A structure of such a power tool is disclosed in Patent Document 1, for example.

The above Patent Document 1 shows a layout in which a control board for controlling the motor is provided around the motor, for example, on the front side of a stator and a cooling fan (the tip tool side in the axial direction of the rotational shaft of the motor).

RELATED ART

Patent Document

[Patent Document 1] Japanese Laid-Open No. 2016-68205

SUMMARY

Problems to be Solved

In the configuration of the above Patent Document 1, the control board is disposed on the front side of the cooling fan, so when large circuit elements are accommodated in the housing, it is necessary to widen the space between the mechanism part and the motor in the axial direction of the rotational shaft, and also to make the housing large in the radial direction. As a result, the main body of the power tool is increased in size.

The invention is to efficiently arrange circuit elements such as the control board to miniaturize the power tool.

Means for Solving the Problems

A power tool of the invention includes: a motor that is a drive source for a tip tool; a control unit controlling driving of the motor; and a power input part to which an AC power is input. The control unit includes a first circuit element and a second circuit element. The second circuit element includes a conversion circuit that converts the AC power input to the power input part into a DC power. The motor is disposed so that at least a part of the motor is sandwiched between the first circuit element and the second circuit element in an axial direction of a drive shaft that drives the tip tool.

Effects

According to the invention, it is possible to miniaturize the power tool.

DESCRIPTION OF THE EMBODIMENTS

Hereinafter, an exemplary embodiment of the invention will be described in detail with reference to the drawings. A power tool according to the present embodiment is a hammer drill 1A shown in FIG. 1 and FIG. 2. The hammer drill 1A has a function of rotating a tip tool 20 with a driving force output from a brushless motor (motor) 10 which is a drive source, and a function of striking the tip tool 20. The tip tool 20 is mounted on the front end of the power tool. The tip tool 20 is a drill bit, for example. The drill bit is used when making a hole in concrete or stone, for example. The tip tool 20 is appropriately replaced according to the type of the object or the work performed on the object.

Figure 3:
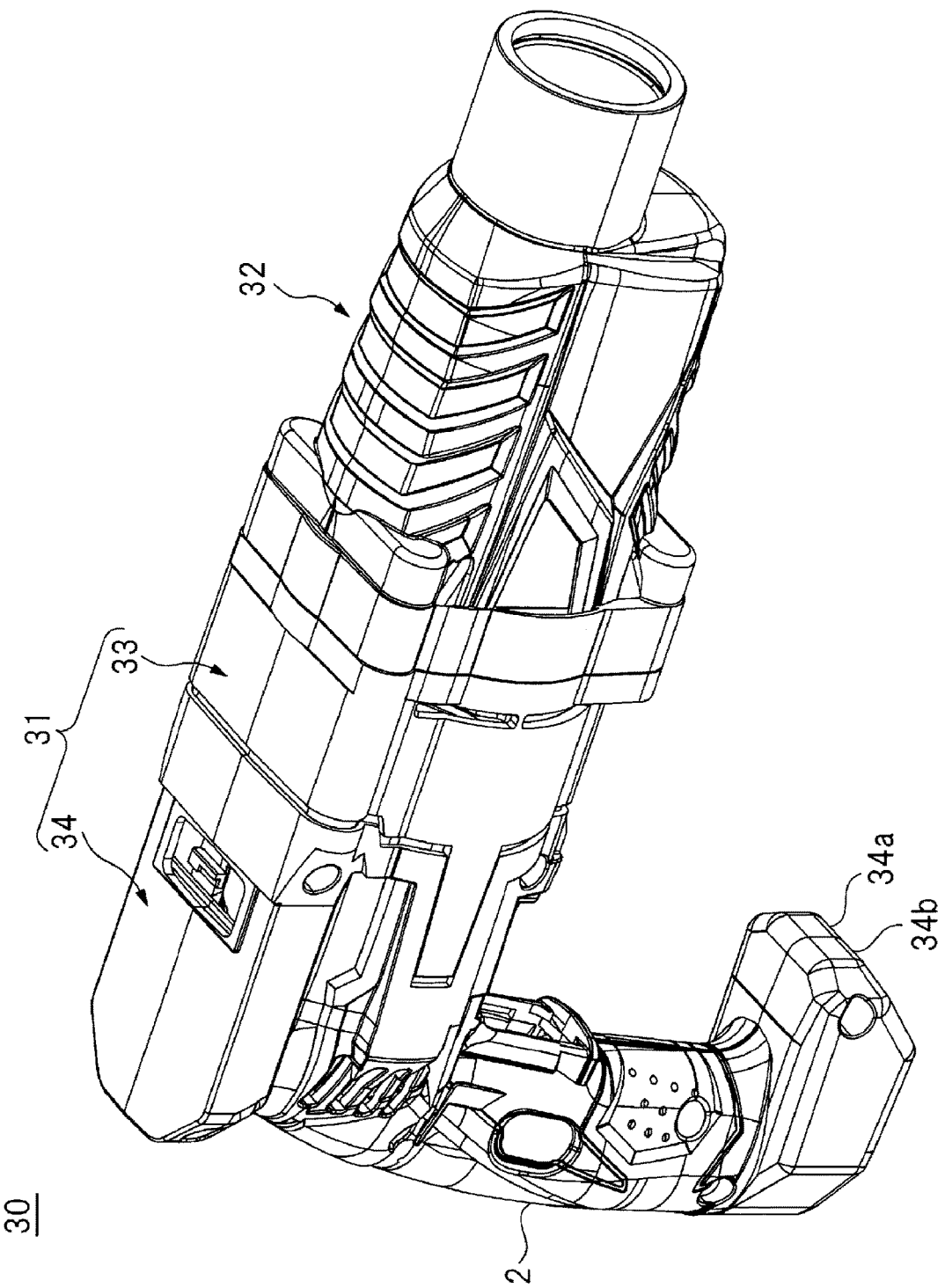
FIG. 3 is a perspective view showing an external structure of a housing of the hammer drill shown in FIG. 1.
Figure 4:
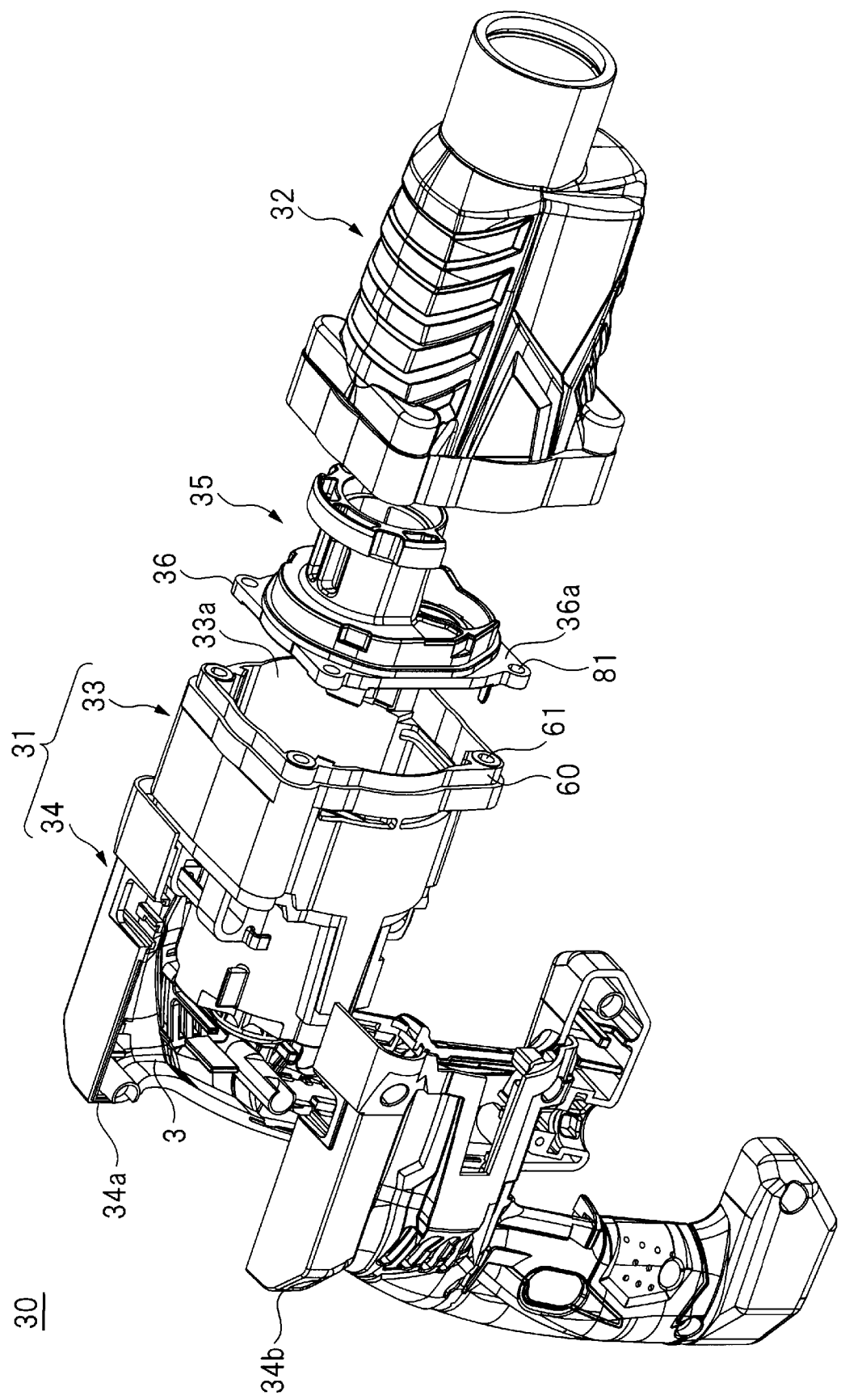
FIG. 4 is an exploded perspective view of the housing of the hammer drill shown in FIG. 1.
Figure 5:
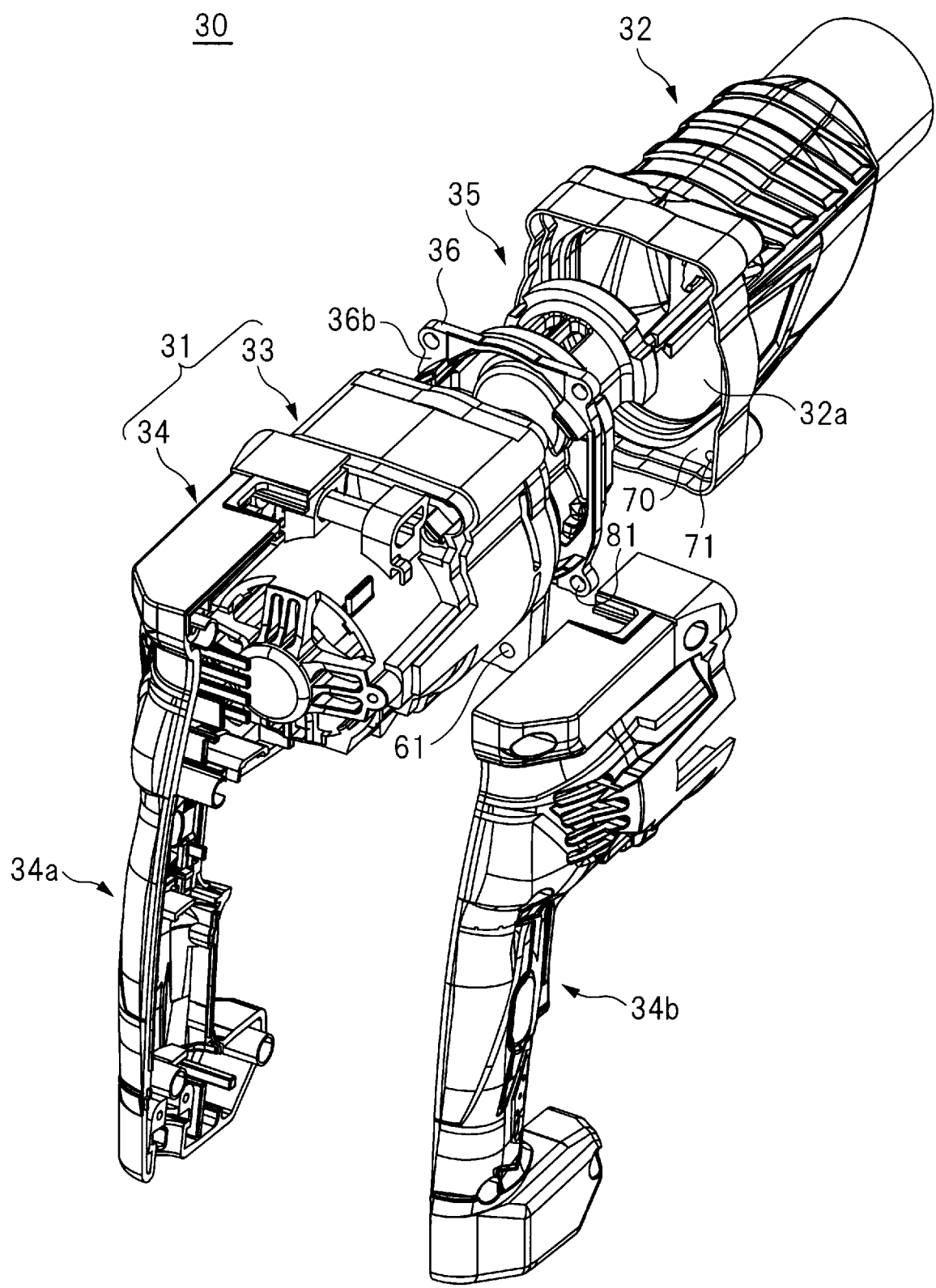
FIG. 5 is another exploded perspective view of the housing of the hammer drill shown in FIG. 1.

The hammer drill 1A has a housing 30 shown in FIG. 3. As shown in FIG. 3 to FIG. 5, the housing 30 includes a first housing 31 and a second housing 32 connected to one end of the first housing 31. Further, the first housing 31 includes a motor housing 33 that accommodates the brushless motor 10, and a handle housing 34 that forms a grip (handle part) 2 which is gripped by an operator. In addition, the handle housing 34 includes two housing half bodies 34a and 34b that face each other with a part (rear part) of the motor housing 33 sandwiched therebetween. In other words, a part (rear part) of the motor housing 33 is covered by a part (upper part) of the handle housing 34. In addition, another part (lower part) of the handle housing 34 forms the grip 2 (see FIG. 1) that is gripped by the operator as described above.

Figure 1:
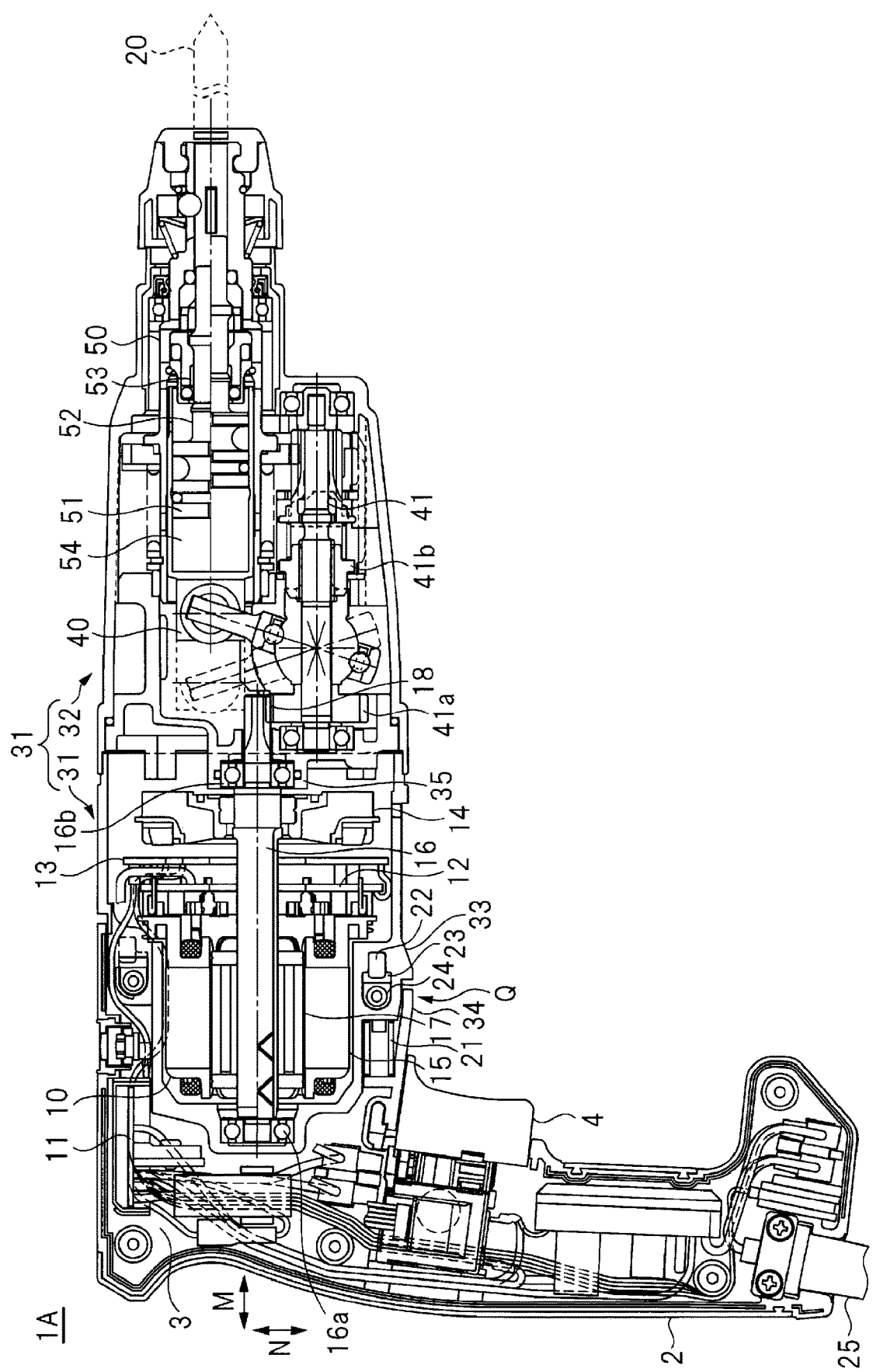
FIG. 1 is a cross-sectional view showing a structure of a hammer drill which is an example of the power tool according to the invention.
Figure 2:
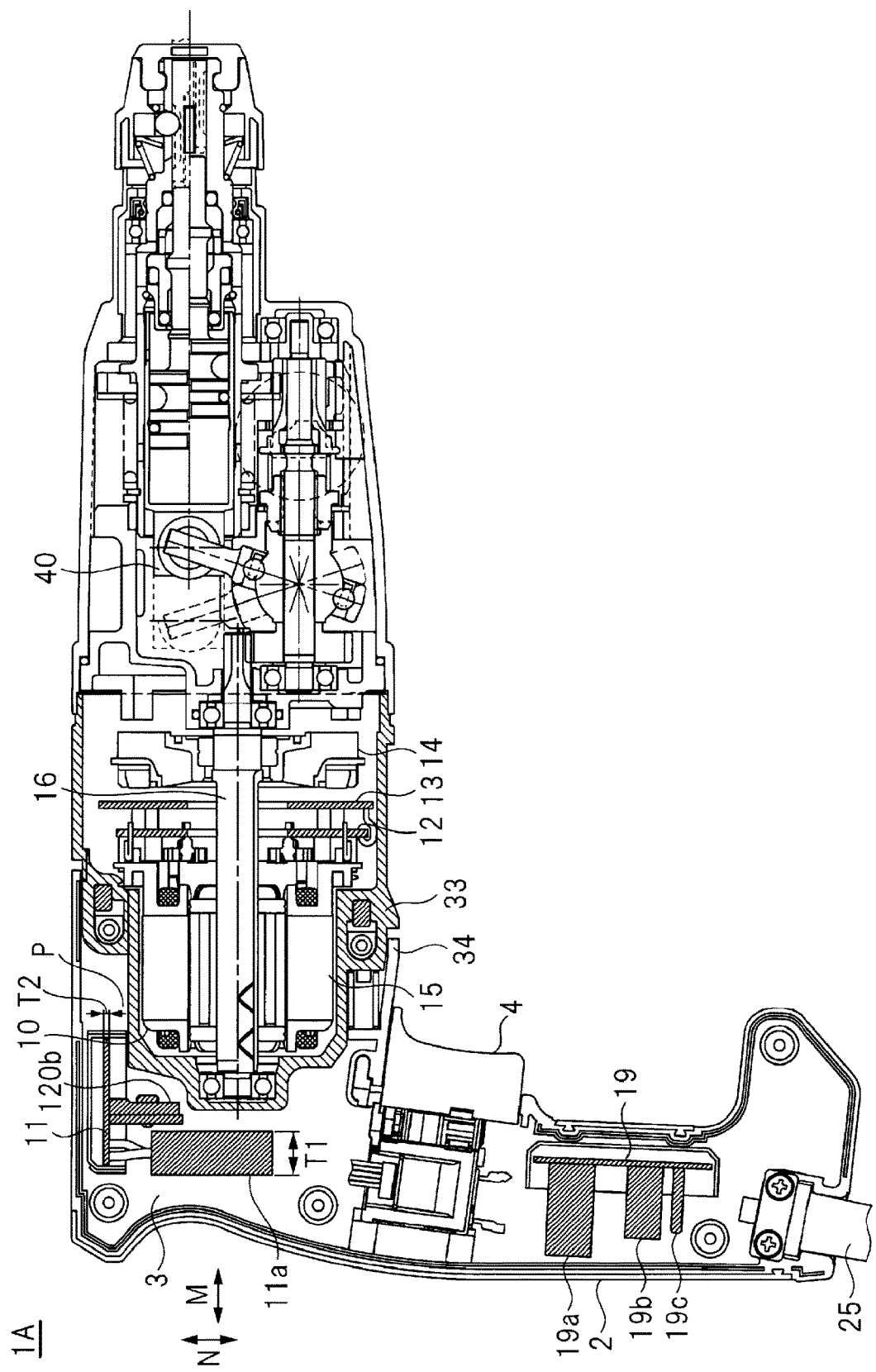
FIG. 2 is a cross-sectional view showing the structure with wirings and a tip tool removed in the hammer drill shown in FIG. 1.

As shown in FIG. 1 and FIG. 2, the first housing 31 mainly accommodates the brushless motor 10, a control unit for controlling the brushless motor 10, and a cooling fan 14. Here, the control unit includes a first circuit element and a second circuit element. The first circuit element is, for example, a switching board (first control board) 12 or a Hall element board (second control board) 13, but is not limited to a board and may be an electronic component installed on a board. The second circuit element is, for example, an electronic component such as an electrolytic capacitor 11a. However, the second circuit element may also be another electronic component such as a diode bridge 120b or a switching element 12a, and is not limited to an electronic component and may be a board such as a control board. The above-mentioned switching board 12, the Hall element board 13, and the electrolytic capacitor 11a will be described in detail later.

The second housing 32 mainly accommodates a power transmission mechanism 40 for transmitting the power output from the brushless motor 10 to the tip tool 20.

The brushless motor 10, the switching board 12, and the Hall element board 13 are accommodated in the motor housing 33 of the first housing 31. Then, a converter board (first circuit board) 11 is accommodated in an accommodation space 3 provided in the handle housing 34 of the first housing 31. The accommodation space 3 is provided outside the motor housing 33 and inside the handle housing 34. That is, the first housing 31 has the accommodation space 3 for accommodating the converter board 11 and the electrolytic capacitor 11a mounted on the converter board 11, and the accommodation space 3 is located outside the motor housing 33 and inside the handle housing 34.

Furthermore, the position of the accommodation space 3 in an axial direction M of a drive shaft 16, which is also the rotational shaft of the brushless motor 10, is a position on the side opposite to the second housing 32 with reference to the motor housing 33.

As shown in FIG. 1, the brushless motor 10 has a stator 15 and a rotor 17 to which the drive shaft 16 is fixed. The drive shaft 16 penetrates the rotor 17 and protrudes from two sides of the rotor 17 in the axial direction M. One end side (rear end side) of the drive shaft 16 protruding from the rotor 17 is rotatably supported by a bearing 16a, and the other end side (front end side) thereof is rotatably supported by a bearing 16b. Further, the front end side of the drive shaft 16 penetrates the cooling fan 14 and an inner cover 35 to enter the second housing 32, and a drive gear 18 is formed at the front end of the drive shaft 16.

Furthermore, an intermediate shaft 41 parallel to the drive shaft 16 is provided inside the second housing 32. The intermediate shaft 41 is one component of a conversion mechanism that converts the power (rotational driving force) output from the brushless motor 10 into a reciprocating driving force. In addition, the conversion mechanism is one component of the power transmission mechanism 40 that transmits the power output from the brushless motor to the tip tool 20. The intermediate shaft 41 is provided with two gears 41a and 41b, and one gear 41a meshes with the drive gear 18. In the following description, the direction of the drive shaft 16 may be referred to as a "rotational shaft direction".

A cylinder 50 is provided inside the second housing 32 in parallel to the intermediate shaft 41. Inside the cylinder 50, a piston 51, a striker 52, and an intermediate element 53 are arranged in a line in this order from the rear to the front, and an air chamber 54 is formed between the piston 51 and the striker 52.

The conversion mechanism is accommodated inside the second housing 32 and around (below) the cylinder 50. The conversion mechanism converts the rotational movement of the drive shaft 16 into the reciprocating movement of the piston 51. The conversion mechanism includes the intermediate shaft 41 described above, an inner ring attached to the intermediate shaft 41, an outer ring having a connection rod, and a rolling element interposed between the inner ring and the outer ring, and the inner ring is spline-fitted with the gear 41b provided on the intermediate shaft 41. When the intermediate shaft 41 is rotated by the rotational driving force output from the brushless motor 10 and input to the intermediate shaft 41 via the drive gear 18 and the gear (driven gear) 41a, the gear 41b rotates. When the gear 41b rotates, the inner ring spline-fitted with the gear 41b rotates. Then, the outer ring moves on the inner ring, and the connection rod provided on the outer ring swings. The piston 51 reciprocates back and forth in the cylinder 50 with the swing of the connection rod. Further, the intermediate shaft 41 is provided with a third gear that constantly meshes with another gear provided on the outer periphery of the cylinder 50, and the cylinder 50 rotates as the intermediate shaft 41 rotates, and the tip tool 20 rotates. These give the tip tool 20 a striking force and a rotational force. The tip tool 20 applied with the striking force and the rotational force in this manner extends in parallel to the rotational shaft direction.

ON/OFF of the brushless motor 10 is switched by an operation of the operator on a trigger switch 4. In addition, the hammer drill 1A of the present embodiment is provided with a forward/reverse switch that switches the rotational direction of the brushless motor 10. When the forward/reverse switch is operated, the direction of the current supplied to the brushless motor 10 changes, and the rotational direction of the brushless motor 10 is reversed, and the tip tool 20 rotates reversely.

Figure 6:
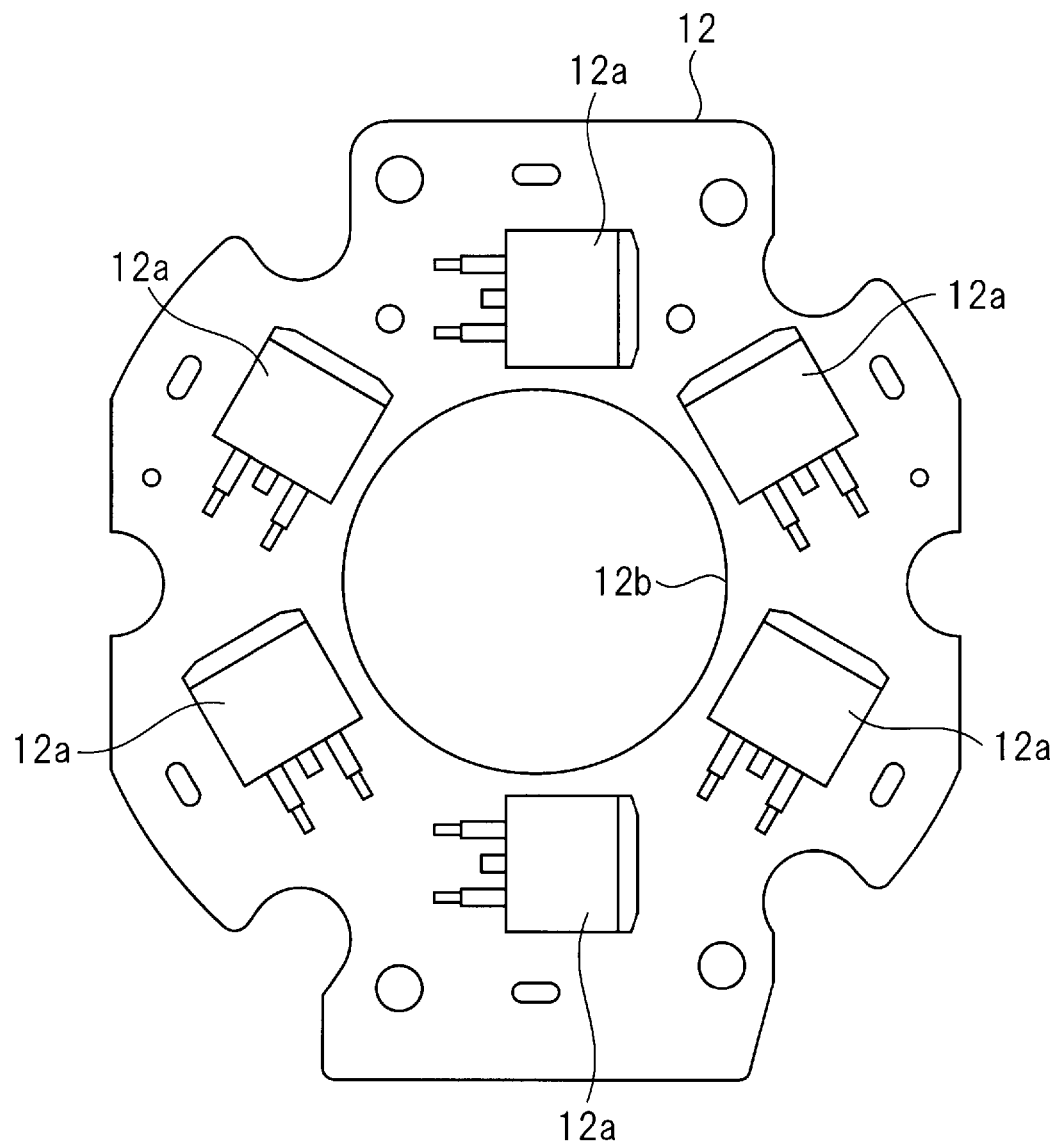
FIG. 6 is a plan view showing a structure of a first control board installed on the hammer drill shown in FIG. 1.
Figure 7:
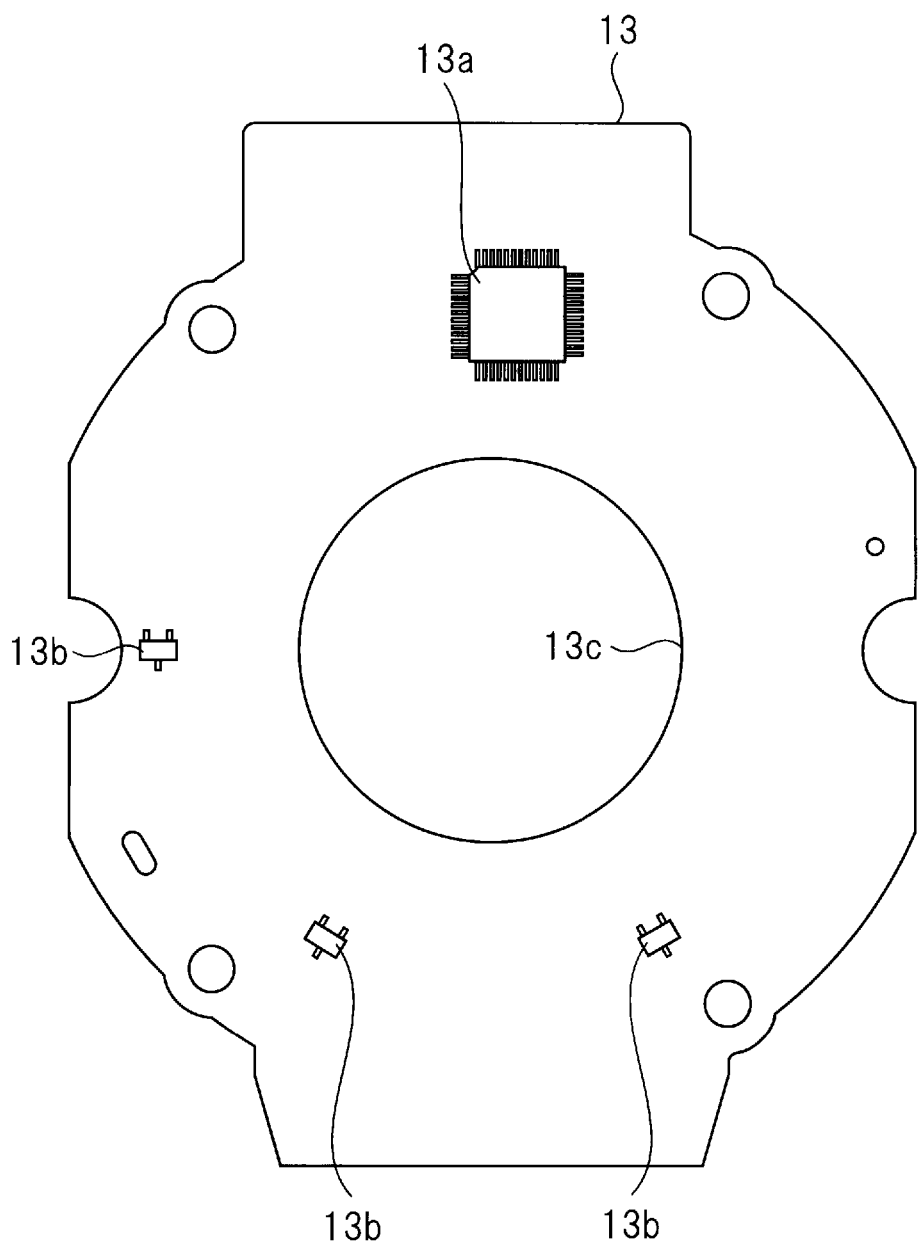
FIG. 7 is a plan view showing a structure of a second control board installed on the hammer drill shown in FIG. 1.

As shown in FIG. 6, for example, six switching elements 12a are installed on the switching board 12 shown in FIG. 1. The switching element 12a is, for example, an IGBT (Insulated Gate Bipolar Transistor) or the like. Furthermore, as shown in FIG. 7, a microcomputer 13a and a plurality of Hall elements 13b are installed on the Hall element board 13. The microcomputer 13a sequentially turns ON/OFF the plurality of switching elements 12a based on the signals output from the plurality of Hall elements 13b to change the direction of the current flowing through a stator coil. In the present embodiment, a magnet is mounted on the cooling fan 14 that rotates integrally with the drive shaft 16 of the brushless motor 10, and the Hall element 13b detects the passage of the magnet and outputs the signal.

Here, a circuit configuration of the hammer drill 1A of the present embodiment will be described.

Figure 8:
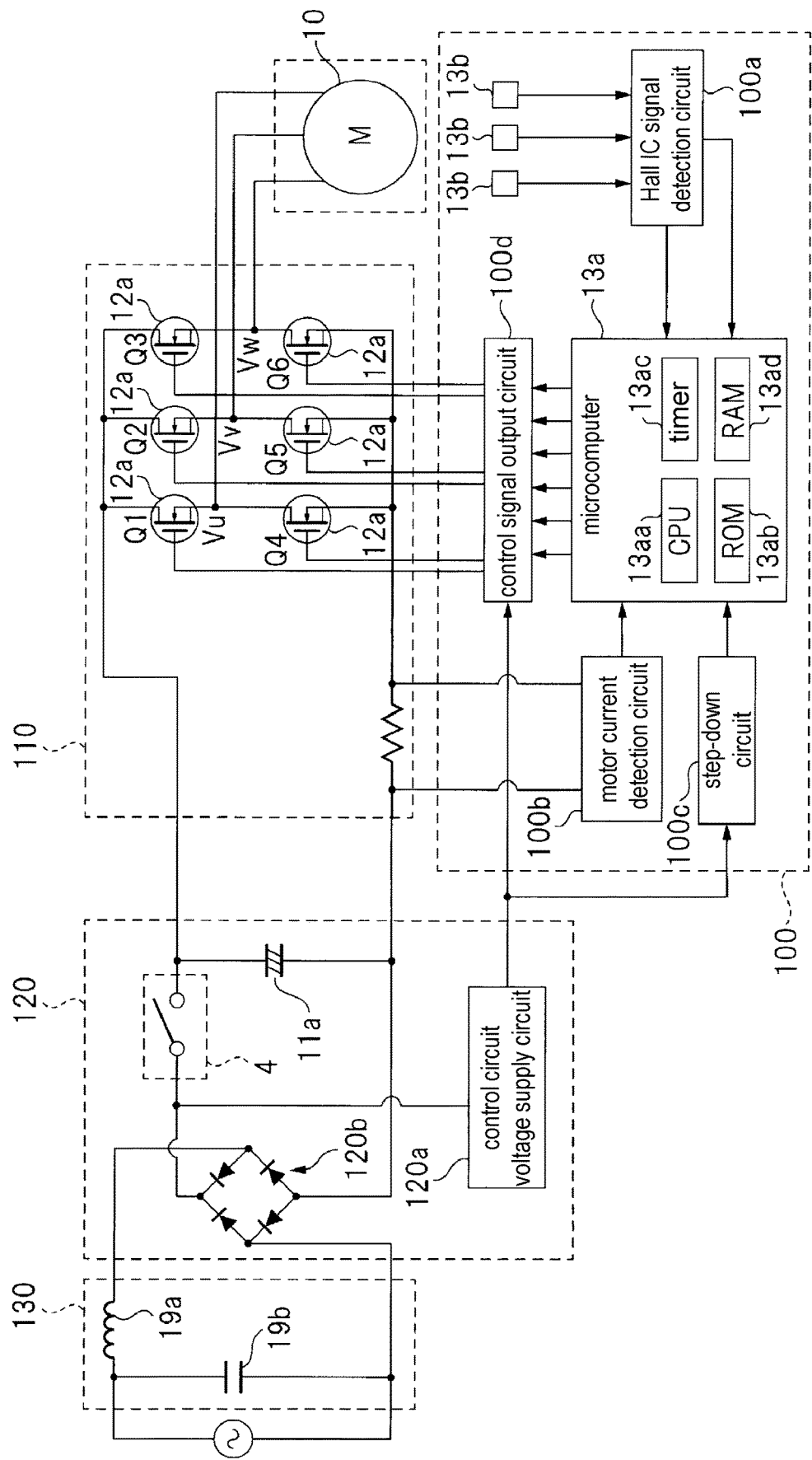
FIG. 8 is a circuit block diagram showing a configuration of a circuit of the hammer drill shown in FIG. 1.

The circuit of the hammer drill 1A includes a control circuit 100, an inverter circuit 110, an AC/DC conversion circuit 120, and a filter circuit 130, as shown in FIG. 8.

The control circuit 100 includes, for example, the microcomputer 13a, a Hall IC signal detection circuit 100a, a motor current detection circuit 100b, a step-down circuit 100c, and a control signal output circuit 100d. The microcomputer 13a has a CPU (Central Processing Unit) 13aa, a ROM (Read Only Memory) 13ab, a timer 13ac, and a RAM (Random Access Memory) 13ad. Accordingly, the control circuit 100 receives the signal from each Hall element 13*b* via the Hall IC signal detection circuit 100*a*, and then based on the signal from each Hall element 13*b*, outputs a control signal to each switching element 12*a* (Q1, Q2, Q3, Q4, Q5, and Q6 shown in FIG. 8) of the inverter circuit 110 via the control signal output circuit 100*d*.

In the hammer drill 1A, the rotation of the brushless motor 10 is controlled by the microcomputer 13*a* of the Hall element board 13. Specifically, in the control circuit 100, the current value of the brushless motor 10 is detected by the motor current detection circuit 100*b*, and the control signal to each switching element 12*a* is adjusted and stopped based on the detected current value. The control circuit 100 is a circuit formed in the Hall element board 13, and since each Hall element 13*b* detects the magnetic pole of the magnet (not shown) installed on the cooling fan 14, the Hall element 13*b* is preferably disposed near the cooling fan 14. That is, regarding the switching board 12 and the Hall element board 13, the Hall element board 13 is preferably disposed on the cooling fan side. The control circuit 100 detects the position of the rotor 17 of the brushless motor 10 by detecting the position of the above-described magnet of the cooling fan 14.

The inverter circuit 110 is a circuit formed on the switching board 12, and supplies the voltage from the AC/DC conversion circuit 120 to the brushless motor 10 via the inverter circuit 110. Since the switching board 12 supplies power to the stator coil, the switching board 12 is preferably disposed closest to the stator 15. That is, in the hammer drill 1A of the present embodiment, as shown in FIG. 1, as an arrangement in the motor housing 33, the switching board 12 and the Hall element board 13 are arranged between the brushless motor 10 and the cooling fan 14, and at this time, the switching board 12 is arranged on the side of the brushless motor 10 and the Hall element board 13 is arranged on the side of the cooling fan 14.

The AC/DC conversion circuit 120 includes the diode bridge 120*b*, the electrolytic capacitor 11*a*, and a control circuit voltage supply circuit 120*a*, and is a circuit formed on the converter board 11. That is, the AC/DC conversion circuit 120 converts an AC voltage supplied from the power supply into a DC voltage by the diode bridge 120*b*, and supplies a predetermined voltage to the control circuit 100 via the control circuit voltage supply circuit 120*a*. Further, after the DC conversion, the DC voltage is smoothed by the electrolytic capacitor 11*a*.

The filter circuit 130 is a circuit formed on a filter board (second circuit board) 19 shown in FIG. 2, and performs filtering so that the high-frequency noise generated by the AC/DC conversion circuit 120 and the switching element 12*a* of the inverter circuit 110 does not affect the AC power side. Accordingly, the filter board 19 is preferably disposed at a position closer to the input part (a power input part 25 to be described later) of the AC power than any of the switching board 12, the Hall element board 13, and the converter board 11.

Next, details of the housing 30 will be described.

As described above, the housing 30 is roughly divided into the first housing 31 and the second housing 32, and the first housing 31 is roughly divided into the motor housing 33 and the handle housing 34. Nevertheless, this distinction is merely a distinction for convenience of description, and the housings are integrated.

As shown in FIG. 3 to FIG. 5, the motor housing 33 has a tubular shape as a whole, and a front opening 33*a* is provided at one end (front end) in the direction of the drive shaft 16 of FIG. 1 (FIG. 4). The second housing 32 also has a tubular shape as a whole, and a rear opening 32*a* is provided at one end (rear end) in the direction of the drive shaft 16 (FIG. 5). Then, as shown in FIG. 4, the motor housing 33 and the second housing 32 are fixed in a state where the ends thereof face each other with a flange part 36 of the inner cover 35 sandwiched therebetween.

As shown in FIG. 4, through holes 61 are formed inside the motor housing 33.

Specifically, a fitting part 60 surrounding the front opening 33*a* is provided on the periphery of the front opening 33*a* of the motor housing 33, and the through holes 61 are formed at four corners of the fitting part 60 respectively. In addition, as shown in FIG. 5, screw holes 71 serving as the coupling parts are formed inside the second housing 32. Specifically, a contact part 70 is provided inside the rear opening 32*a* of the second housing 32, and the screw holes 71 are formed at four corners of the contact part 70 respectively. The through holes 61 provided in the motor housing 33 and the screw holes 71 provided in the second housing 32 extend in parallel to the direction of the drive shaft 16 of FIG. 1 (extending in the left-right direction of the plane of FIG. 5).

As shown in FIG. 5, when the inner cover 35 is inserted into the second housing 32 from the rear opening 32*a* of the second housing 32, a front surface 36*a* (see FIG. 4) of the flange part 36 of the inner cover 35 abuts against the contact part 70 of the second housing 32. Then, the communication holes 81 provided at four corners of the flange part 36 of the inner cover 35 communicate with the corresponding screw holes 71 respectively. Furthermore, when the fitting part 60 (see FIG. 4) of the motor housing 33 is inserted from the rear of the inner cover 35 into the rear opening 32*a* of the second housing 32, the end surface of the fitting part 60 abuts against a back surface 36*b* of the flange part 36 of the inner cover 35. Then, the through holes 61 provided at four corners of the fitting part 60 of the motor housing 33 communicate with the corresponding communication holes 81 respectively. That is, when the second housing 32, the motor housing 33, and the inner cover 35 are combined in a predetermined order, the flange part 36 of the inner cover 35 is sandwiched between the contact part 70 of the second housing 32 and the fitting part 60 of the motor housing 33. At the same time, the through holes 61 provided in the fitting part 60 of the motor housing 33 and the screw holes 71 provided in the contact part 70 of the second housing 32 communicate with each other through the communication holes 81 provided in the flange part 36 of the inner cover 35. In other words, inside the housing 30, the through holes 61, the communication holes 81, and the screw holes 71 are connected in series.

The first housing 31 (motor housing 33) and the second housing 32 combined as described above are parallel to the direction of the drive shaft 16 of FIG. 1, and are fixed by a fixing member which penetrates the inner cover 35 and extends across the motor housing 33 and the second housing 32.

Next, the features of the hammer drill 1A of the present embodiment will be described. The hammer drill 1A has a body weight of about 2 kg, for example, and the arrangement of the boards incorporated therein is devised. First, as shown in FIG. 1 and FIG. 2, in the hammer drill 1A, as described above, the control board, which is the first circuit element, is divided into two, i.e., the switching board (first control board) 12 and the Hall element board (second control board) 13, and these switching board 12 and Hall element board 13 are disposed in an overlapping state. In detail, the switching board 12 and the Hall element board 13 are arranged so that the planar directions of the respective boards are perpendicular to the axial direction M of the brushless motor 10 and the respective boards are parallel to each other.

Furthermore, the hammer drill 1A has the electrolytic capacitor 11a as the second circuit element. Then, the brushless motor 10 is arranged so that at least a part of the brushless motor 10 is sandwiched between the control board (first circuit element) and the electrolytic capacitor (second circuit element) 11a in the axial direction M of the drive shaft 16 that drives the tip tool 20.

Specifically, as shown in FIG. 2, the switching board 12 and the Hall element board 13 are disposed to overlap on the side of the cooling fan 14 of the brushless motor 10 (front side) in the axial direction M of the brushless motor 10. On the other hand, the electrolytic capacitor 11a is disposed on the side (rear side) opposite to the cooling fan 14 in the axial direction M of the brushless motor 10. That is, in the hammer drill 1A, the control board (the switching board 12 and the Hall element board 13) and the electronic component (the electrolytic capacitor 11a) are disposed before and after the brushless motor 10 in the axial direction M of the brushless motor 10.

Thus, the spaces before and after the brushless motor 10 can be effectively utilized to miniaturize the hammer drill 1A.

Here, the drive shaft 16 of the brushless motor 10 is provided to penetrate the switching board 12 and the Hall element board 13 respectively. Specifically, as shown in FIG. 6 and FIG. 7 respectively, a circular through hole 12b is formed in the center of the switching board 12, and a circular through hole 13c is formed in the center of the Hall element board 13. Then, the drive shaft 16 is arranged to penetrate the through holes 12b and 13c of the respective boards.

In addition, the second circuit element such as the electrolytic capacitor 11a and the diode bridge 120b is positioned on the opposite side of the first circuit element such as the switching board 12 and the Hall element board 13 relative to the stator 15d in the axial direction M of the drive shaft 16 of the brushless motor 10. Nevertheless, the above-described second circuit element is not limited to the electrolytic capacitor 11a and the diode bridge 120b, and may be a switching element or the like.

Here, in the hammer drill 1A, as shown in FIG. 2, the accommodation space 3 is formed on the rear side of the brushless motor 10, and the electrolytic capacitor 11a having a large volume and the diode bridge 120b are disposed in the accommodation space 3. The hammer drill 1A includes the motor housing 33 that accommodates the brushless motor 10, and the handle housing 34 that forms the grip (handle part) 2 to be gripped by the operator and is provided to overlap a part of the motor housing 33 in the radial direction N of the drive shaft 16. Then, the motor housing 33 is attached with the switching board 12 and the Hall element board 13 as the above-described first circuit element, and the handle housing 34 is attached with the converter board (first circuit board) 11 on which the electrolytic capacitor (second circuit element) 11a and the diode bridge 120b are mounted.

In detail, the hammer drill 1A further has the first circuit board that is attached to the handle housing 34 and electrically connected to the second circuit element such as the electrolytic capacitor 11a. The above-described first circuit board has a plate shape that extends in parallel to the drive shaft 16 of the brushless motor 10 and is disposed outside the brushless motor 10 in the radial direction N of the drive shaft 16. In the hammer drill 1A of the present embodiment, the above-described first circuit board is the converter board 11 in which a circuit for AC/DC converting an input signal from a power supply is formed.

That is, in the handle housing 34, the converter board 11 is disposed in a space above the rear part of the brushless motor 10 (a space where the height of the rear upper part of the brushless motor 10 in the radial direction N of the drive shaft 16 is small, the part P in FIG. 2), and further, the electrolytic capacitor 11a that has a large volume and a large thickness is disposed in the accommodation space 3 in the rear of the brushless motor 10. As an example, as shown in FIG. 2, the thickness T1 of the electrolytic capacitor 11a in the direction along the axial direction M of the drive shaft 16 is greater than the thickness T2 of the converter board 11 (T1>T2).

In addition, as shown in FIG. 1, the motor housing 33 and the handle housing 34 are connected to each other via an anti-vibration rubber (anti-vibration part) 22 having an elastic body, and are housing structures that are movable relative to each other in the axial direction M of the drive shaft 16 of the brushless motor 10. In detail, the motor housing 33 and the handle housing 34 have structures that are movable (slidable) relative to each other along the axial direction M of the brushless motor 10. Specifically, the handle housing 34 is slidable relative to the motor housing 33.

Therefore, a space needs to be provided on the rear side of the motor housing 33 in the handle housing 34 for the handle housing 34 to move toward the front side along the axial direction M relative to the motor housing 33. The accommodation space 3 is provided in the handle housing 34 as this space. Then, in the hammer drill 1A, in order to effectively utilize the accommodation space 3, the electrolytic capacitor 11a having a large volume is disposed in the accommodation space 3.

Accordingly, the brushless motor 10 includes the switching board 12 and the Hall element board 13 in the axial direction M of the drive shaft 16, and the stator 15 disposed to be sandwiched between the electrolytic capacitor 11a, and the switching board 12 and the Hall element board 13.

As described above, in the hammer drill 1A, the space (accommodation space 3) allowing relative movement between the motor housing 33 and the handle housing 34 is secured on the rear side of the brushless motor 10, and the electrolytic capacitor 11a having a large volume is disposed in the accommodation space 3, by which the miniaturization of the hammer drill 1A can be maintained.

In other words, in the hammer drill 1A, as shown in FIG. 2, the circuit elements that match the sizes of the respective spaces are disposed in the accommodation space 3 in the rear of the brushless motor 10 and the space of the part P in the rear upper part of the brushless motor 10, by which the space is effectively utilized to maintain the miniaturization of the hammer drill 1A.

Although the motor housing 33 and the handle housing 34 have structures that are movable (slidable) relative to each other along the axial direction M of the brushless motor 10 as described above, as shown in FIG. 1, an elongated hole 23 and the anti-vibration rubber (anti-vibration part) 22 provided at the end of the elongated hole 23 on the tool front end side are provided in an engaging part Q of the motor housing 33 with respect to the handle housing 34.

Then, the engaging part Q of the handle housing 34 with respect to the motor housing 33 is provided with a screw boss part 24, and the screw boss part 24 is slidably fitted into the elongated hole 23 of the motor housing 33. That is, the screw boss part 24 is formed integrally with the handle housing 34, and is slidably disposed in the elongated hole 23 of the motor housing 33. The screw boss part 24 is a boss part used when fixing the housing half body 34a and the housing half body 34b shown in FIG. 4 with screws, and by fixing the housing half body 34a and the housing half body 34b with screws via the screw boss part 24, the handle housing 34 is attached to the motor housing 33 to be slidable within the movable range of the space part of the elongated hole 23 shown in FIG. 1.

In addition, as shown in FIG. 1, a spring 21 is provided in the engaging part Q of the handle housing 34 with respect to the motor housing 33. The spring 21 is provided in the handle housing 34 so as to apply an elastic force for directing the handle housing 34 rearward on the motor housing 33.

With the structure of the engaging part Q described above, when the operator grips the hammer drill 1A and works, if the handle housing 34 is pressed toward the front end side, the handle housing 34 slides toward the front end side, and the sliding of the handle housing 34 stops in a state where the screw boss part 24 is pressed against the anti-vibration rubber 22 of the motor housing 33.

If the operator works with use of the hammer drill 1A in this state, the vibration of the handle housing 34 can be absorbed by the anti-vibration function of the anti-vibration rubber 22 to reduce the vibration of the handle housing 34.

According to the above, with the hammer drill 1A of the present embodiment, the vibration of the handle housing 34 during work is reduced while the miniaturization is maintained, by which the burden on the operator during work can be reduced.

Further, as shown in FIG. 2, the power input part 25 is provided at the end of the handle housing 34 on the side opposite to the side where the converter board 11 is disposed in the radial direction N, and in the handle housing 34, the second circuit board is attached closer to the power input part 25 than any of the switching board 12, the Hall element board 13, and the converter board 11. Then, the above-described second circuit board is the filter board 19 on which a noise filter element is installed. The above-described noise filter element is a coil 19a or a capacitor 19b. That is, in the handle housing 34 of the hammer drill 1A, the filter board 19 is provided closer to the power input part 25 thereof than any of the switching board 12, the Hall element board 13, and the converter board 11. As a result, it is possible to reduce the adverse effect of the noise oscillated from the switching board 12, the Hall element board 13, and the converter board 11 on the power signal, etc. sent from the power input part 25. Further, a varistor 19c is installed on the filter board 19 as a high voltage protection element.

Figure 9:
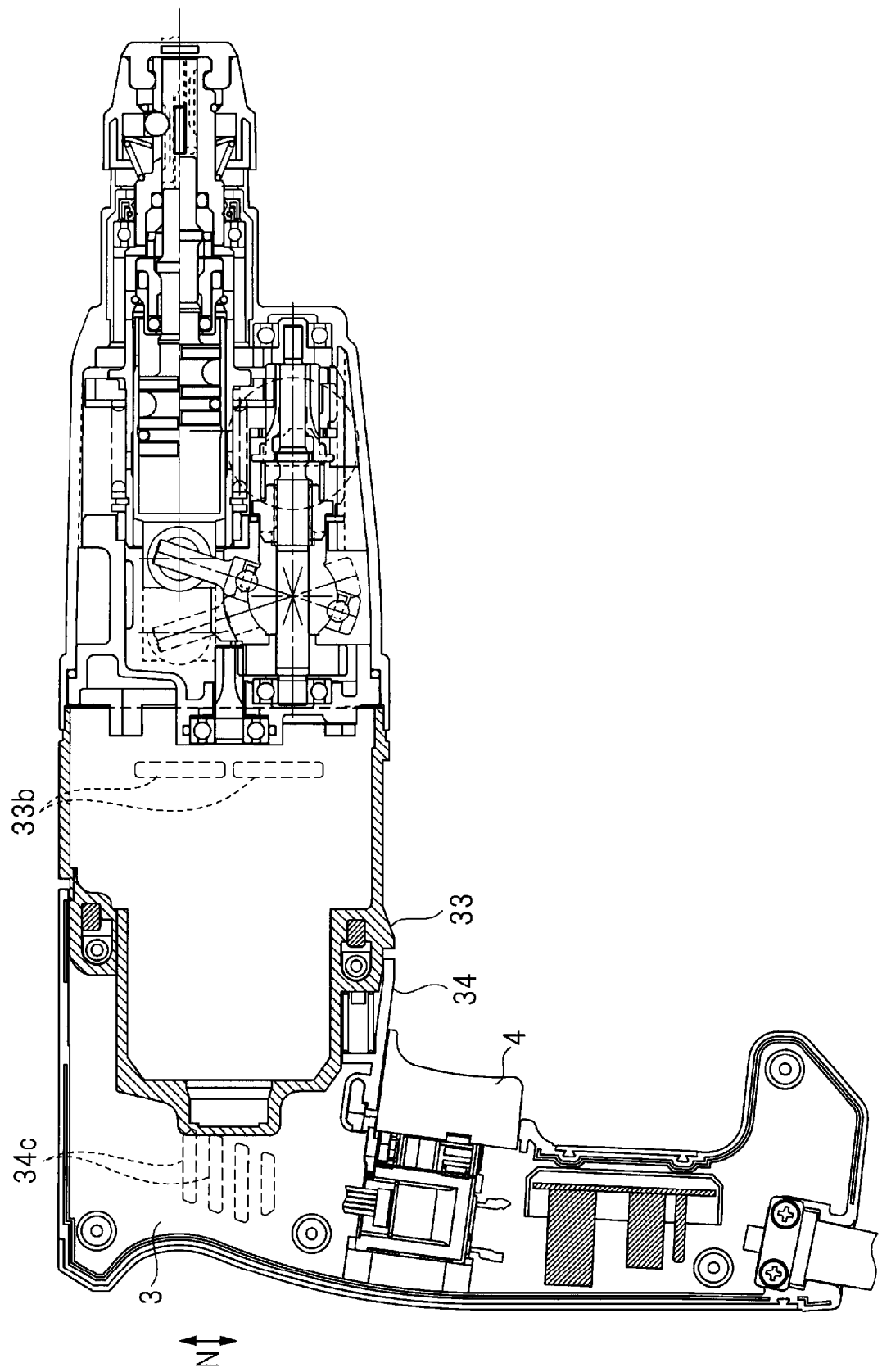
FIG. 9 is a cross-sectional view showing vents of the housing of the hammer drill shown in FIG. 1.

Next, as shown in FIG. 9, the motor housing 33 is formed with two openings 33b arranged side by side in the radial direction N. Further, the handle housing 34 is also formed with four openings 34c arranged side by side in the radial direction N. These openings 33b and 34c are opening windows for forming the air passages 26 shown in FIG. 10. In detail, in the hammer drill 1A, the components (elements) that generate a large amount of heat are, for example, a plurality of switching elements 12a installed on the switching board 12, and the electrolytic capacitor 11a and the diode bridge 120b installed on the converter board 11, etc. Therefore, the openings 33b and 34c are formed in the motor housing 33 and the handle housing 34 so that the locations where these heat-generating components (elements) including the brushless motor 10 are installed become the air passages 26.

Figure 10:
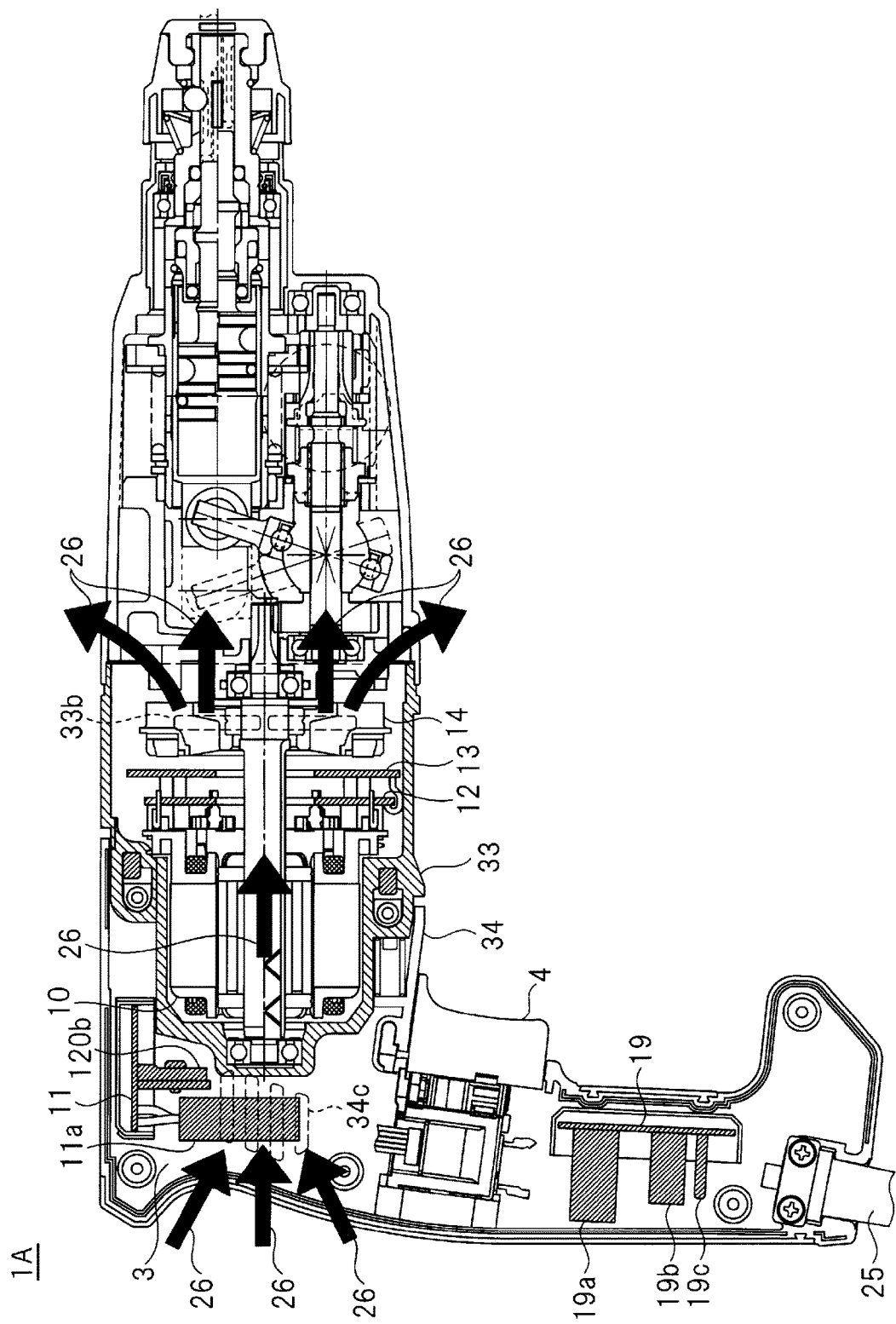
FIG. 10 is a cross-sectional view showing air passages of the hammer drill shown in FIG. 1.

That is, in the hammer drill 1A, as indicated by the air passages 26 of FIG. 10, air is introduced from a plurality of openings 34c in the rear of the motor formed in the handle housing 34, and the air (wind) is applied to the electrolytic capacitor 11a, the diode bridge 120b, the brushless motor 10, and the switching board 12 and the Hall element board 13 and then discharged to the outside from the two openings 33b of the motor housing 33. In the air passage 26, the switching board 12 is disposed on the upstream side of the Hall element board 13. Thus, more air (wind) can be applied to the switching board 12 on which many heat-generating components are installed.

According to the above, the hammer drill 1A can be miniaturized while the accommodation space 3 behind the motor is effectively utilized, and the diode bridge 120b, the electrolytic capacitor 11a, and the plurality of switching elements 12a, which are heat-generating components, are efficiently cooled.

Further, in the hammer drill 1A, as shown in FIG. 2, the handle housing 34 is provided with the trigger switch 4, and the filter board 19 for noise filtering is installed below the trigger switch 4 (the side of the power input part 25) and the trigger switch 4 and the filter board 19 are integrally configured.

Thus, the assemblability of the hammer drill 1A can be improved.

However, the invention is not limited to the embodiment described above, and various modifications can be made without departing from the gist of the invention.

Here, the first modified example and the second modified example of the present embodiment will be described.

Figure 11:
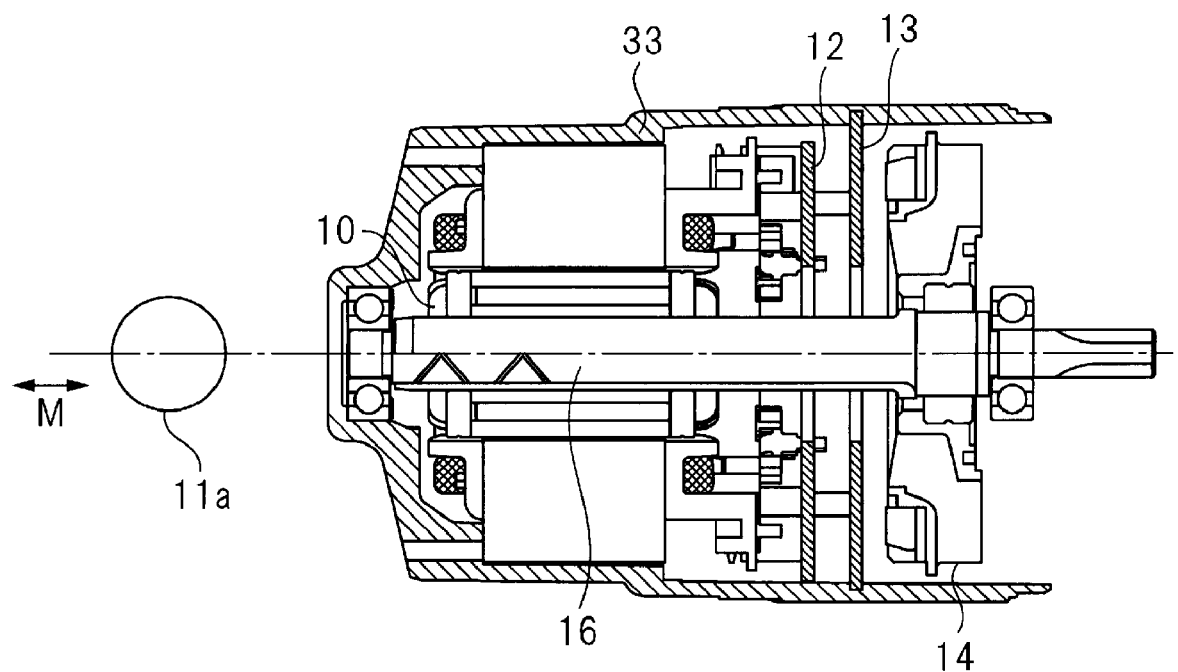
FIG. 11 is a partial cross-sectional view showing an arrangement of an electrolytic capacitor with respect to a motor housing of the hammer drill shown in FIG. 1.
Figure 12:
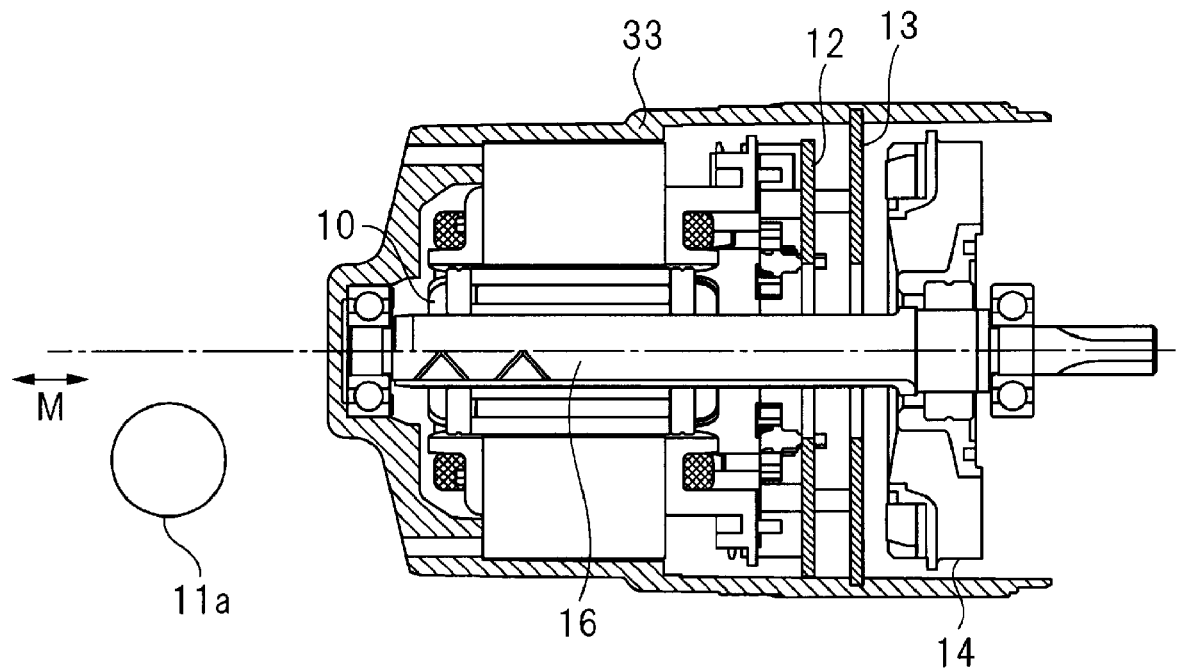
FIG. 12 is a partial cross-sectional view showing a modified example of the arrangement of the electrolytic capacitor shown in FIG. 11.

First, the arrangement position of the electrolytic capacitor 11a installed on the converter board 11 in the hammer drill 1A in a plan view will be described. As shown in FIG. 11, the arrangement position of the electrolytic capacitor 11a in a plan view is preferably arranged on the drive shaft 16 of the brushless motor 10. However, in consideration of the sliding operation of the handle housing 34 with respect to the motor housing 33, the arrangement position of the electrolytic capacitor 11a in a plan view may be a position deviating from the drive shaft 16 of the brushless motor 10, as shown in the first modified example of FIG. 12, for example.

Figure 13:
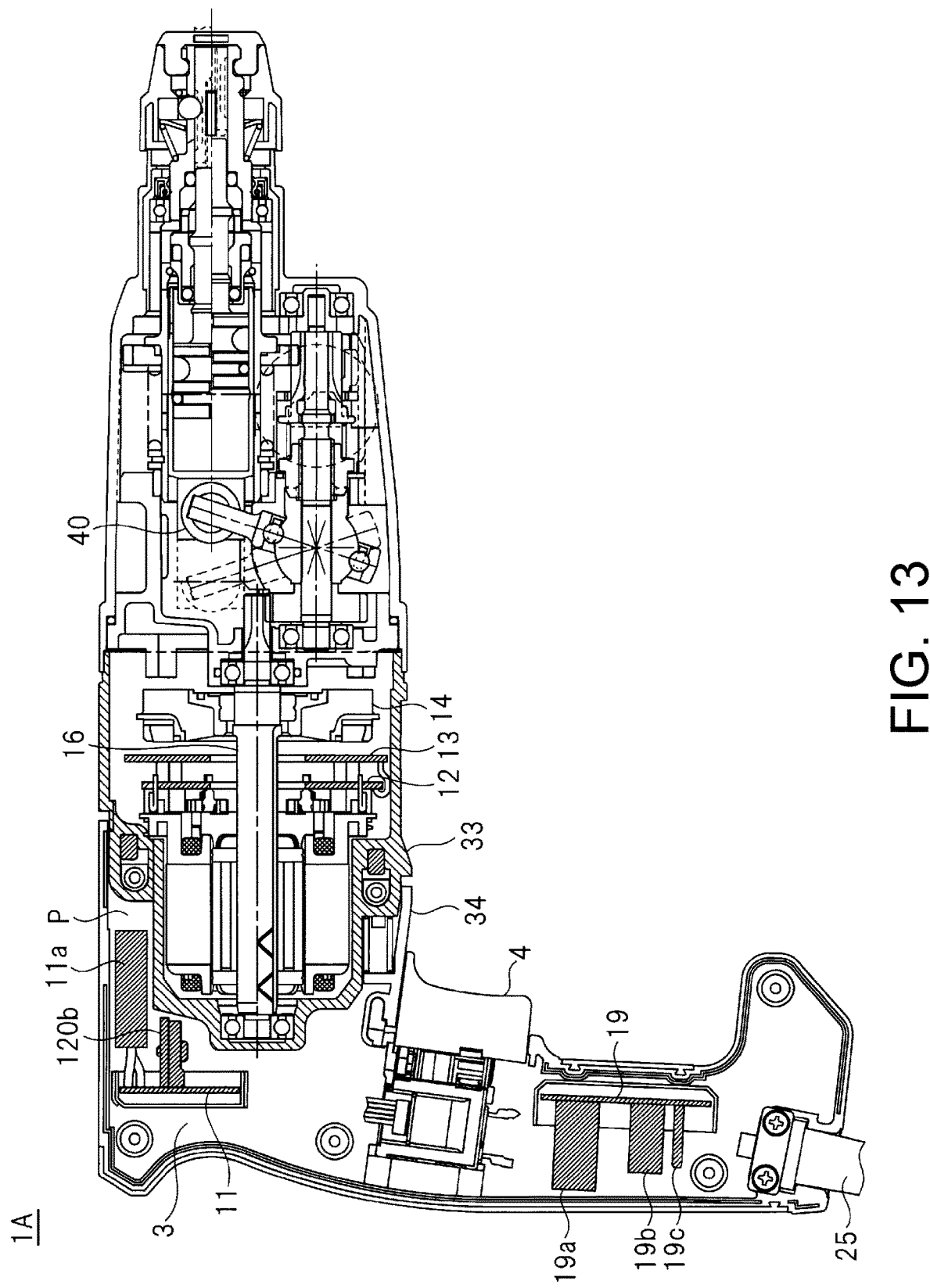
FIG. 13 is a cross-sectional view showing a modified example of an arrangement of a second circuit element of the hammer drill shown in FIG. 1.

In addition, regarding the arrangement positions of the converter board 11 and the electrolytic capacitor 11a installed on the converter board 11, an example has been described in which, in the hammer drill 1A of the present embodiment, the converter board 11 is disposed in the space of the part P above the rear part of the brushless motor 10 in the handle housing 34, and the electrolytic capacitor 11a having a large thickness is disposed in the accommodation space 3 in the rear of the brushless motor 10. Regarding the arrangement positions of the converter board 11 and the electrolytic capacitor 11a, the above-described case utilizes the space more effectively, but when the electrolytic capacitor 11a can be disposed in the space of the part P above the rear part of the brushless motor 10, the converter board 11 may be disposed in the accommodation space 3 in the rear of the brushless motor 10, as shown in the second modified example of FIG. 13. In that case, in the sense that the converter board 11 and the electrolytic capacitor 11a can be accommodated in the space of the part P above the rear part of the brushless motor 10 and the accommodation space 3 in the rear, it is still possible to realize the hammer drill 1A that effectively utilizes the space.

Furthermore, in the above-described embodiment, the hammer drill 1A is taken as the power tool. However, the power tool of the invention also includes a power tool that gives only a striking force to the tip tool (for example, a hammer) and a power tool that gives only a rotational force to the tip tool (for example, an impact driver).

What is claimed is:

1. A power tool, comprising:
   a motor that is a drive source for a tip tool;
   a control unit controlling driving of the motor; and
   a power input part to which an AC power is input,
   wherein the control unit comprises a first circuit element and a second circuit element,
   the second circuit element comprises a conversion circuit that converts the AC power input to the power input part into a DC power and a first circuit board on which the conversion circuit is mounted, and
   the motor is disposed so that at least a part of the motor is sandwiched between the first circuit element and the second circuit element in an axial direction of a drive shaft that drives the tip tool,
   wherein the motor comprises a stator that is disposed to be sandwiched between the first circuit element and the second circuit element in the axial direction of the drive shaft.

2. The power tool according to claim 1, wherein the first circuit element comprises at least one control board, and
   the drive shaft is provided to penetrate the control board.

3. The power tool according to claim 1, wherein the first circuit element comprises a first control board and a second control board, and
   the drive shaft is provided to penetrate each of the first control board and the second control board.

4. The power tool according to claim 1, wherein the second circuit element is any one of an electrolytic capacitor, a diode bridge, and a switching element.

5. The power tool according to claim 1, wherein the first circuit element comprises a first control board and a second control board, and
   the first control board and the second control board are disposed in parallel.

6. The power tool according to claim 1, wherein the first circuit board has a plate shape extending in parallel to the drive shaft and is disposed outside the motor in the radial direction of the drive shaft,
   wherein the first circuit element and the conversion circuit are disposed to overlap on the motor in the axial direction, and
   the motor is disposed so that at least a part of the motor is sandwiched between the first circuit element and the conversion circuit in the axial direction of the drive shaft.

7. A power tool, comprising:
   a motor that is a drive source for a tip tool;
   a control unit controlling driving of the motor;
   a power input part to which an AC power is input;
   a motor housing that accommodates the motor; and
   a handle housing that forms a handle part to be gripped by an operator and is provided to overlap a part of the motor housing in a radial direction of a drive shaft that drives the tip tool,
   wherein the control unit comprises a first circuit element and a second circuit element,
   the second circuit element comprises a conversion circuit that converts the AC power input to the power input part into a DC power and a first circuit board on which the conversion circuit is mounted,
   the motor is disposed so that at least a part of the motor is sandwiched between the first circuit element and the second circuit element in an axial direction of the drive shaft,
   wherein the first circuit element is attached to the motor housing, and
   the second circuit element is attached to the handle housing.

8. The power tool according to claim 7, wherein the first circuit board is attached to the handle housing and electrically connected to the second circuit element,
   wherein the first circuit board has a plate shape extending in parallel to the drive shaft and is disposed outside the motor in the radial direction of the drive shaft.

9. The power tool according to claim 8, wherein a thickness of the electrolytic capacitor in a direction along the axial direction of the drive shaft is greater than a thickness of the first circuit board.

10. The power tool according to claim 8, wherein the power input part is provided at an end of the handle housing on a side opposite to a side where the first circuit board is disposed, and
    in the handle housing, a second circuit board is attached closer to the power input part than any of the first circuit element and the first circuit board.

11. The power tool according to claim 10, wherein a noise filter element is installed on the second circuit board.

12. The power tool according to claim 8, wherein
    the first circuit element and the conversion circuit are disposed to overlap on the motor in the axial direction, and
    the motor is disposed so that at least a part of the motor is sandwiched between the first circuit element and the conversion circuit in the axial direction of the drive shaft.

13. The power tool according to claim 7, wherein the motor housing and the handle housing are members that are connected via an anti-vibration part having an elastic body and are movable relative to each other in the axial direction of the drive shaft.

* * * * *